US007148484B2

(12) United States Patent
Craig et al.

(10) Patent No.: US 7,148,484 B2
(45) Date of Patent: Dec. 12, 2006

(54) CELLULAR TELEPHONE-BASED RADIATION SENSOR AND WIDE-AREA DETECTION NETWORK

(75) Inventors: William W. Craig, Pittsburg, CA (US); Simon E. Labov, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 148 days.

(21) Appl. No.: 10/632,169

(22) Filed: Jul. 30, 2003

(65) Prior Publication Data

US 2004/0149918 A1 Aug. 5, 2004

Related U.S. Application Data

(60) Provisional application No. 60/442,361, filed on Jan. 24, 2003.

(51) Int. Cl.
 *G01J 1/24* (2006.01)
(52) U.S. Cl. ............................................. 250/370.01
(58) Field of Classification Search ............ 250/370.01
 See application file for complete search history.

(56) References Cited

U.S. PATENT DOCUMENTS

| 5,173,609 | A |  | 12/1992 | Lacoste et al. |  |
|---|---|---|---|---|---|
| 5,723,866 | A | * | 3/1998 | Hamilton, Jr. | 250/370.09 |
| 6,031,454 | A |  | 2/2000 | Lovejoy et al. |  |
| 6,034,373 | A | * | 3/2000 | Shahar et al. | 250/370.01 |
| 6,088,585 | A |  | 7/2000 | Schmitt et al. |  |
| 6,194,726 | B1 | * | 2/2001 | Pi et al. | 250/363.1 |
| 6,559,452 | B1 | * | 5/2003 | Tashiro | 250/370.09 |
| 6,694,172 | B1 | * | 2/2004 | Gagnon et al. | 600/436 |
| 2003/0155516 | A1 | * | 8/2003 | Spartiotis et al. | 250/370.09 |

FOREIGN PATENT DOCUMENTS

| DE | 198 22 161 A1 | 11/1999 |
|---|---|---|
| DE | 101 20 697 A1 | 11/2002 |
| EP | 1158292 A2 | 3/2001 |
| WO | WO 02/33441 A1 | 4/2002 |

OTHER PUBLICATIONS

Chris A Pickett et al, Current Applications of the Oak Ridge Sensors for Enhancing Nuclear Safeguards (Orsens).
P.R. Bennet et al, Multi-Element CdZnTe Detectors for Gamma Ray Detection and Imaging, 1998 IEEE pp. 417-420.
M.A. Beck et al, Hot Cell Remote Nuclear Scanning of Tank Core Samples, Westinghouse Hanford Co. WHC-SA-2933-FP UC-606.

* cited by examiner

*Primary Examiner*—David Porta
*Assistant Examiner*—Marcus Taningco
(74) *Attorney, Agent, or Firm*—James S. Tak

(57) ABSTRACT

A network of radiation detection instruments, each having a small solid state radiation sensor module integrated into a cellular phone for providing radiation detection data and analysis directly to a user. The sensor module includes a solid-state crystal bonded to an ASIC readout providing a low cost, low power, light weight compact instrument to detect and measure radiation energies in the local ambient radiation field. In particular, the photon energy, time of event, and location of the detection instrument at the time of detection is recorded for real time transmission to a central data collection/analysis system. The collected data from the entire network of radiation detection instruments are combined by intelligent correlation/analysis algorithms which map the background radiation and detect, identify and track radiation anomalies in the region.

33 Claims, 3 Drawing Sheets

CELLULAR TELEPHONE-BASED RADIATION SENSOR AND WIDE-AREA DETECTION NETWORK

I. CLAIM OF PRIORITY IN PROVISIONAL APPLICATION

This application claims priority in provisional application filed on Jan. 24, 2003, entitled "Radnet: A Cellular Telephone-Based Radiation Detector Network" Ser. No. 60/442,361, by inventors William W. Craig and Simon E. Labov.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to detection instruments and networks, and more particularly to a cellular telephone-based radiation detection instrument and a wide-area detection network comprising a large number of such instruments for monitoring, detecting, and/or tracking radiation in a given geographic region.

III. BACKGROUND OF THE INVENTION

There is a growing national need for a system capable of detecting small amounts of radioactive material, such as special nuclear material (SNM) and shielded highly enriched uranium (HEU), especially in an unknown environment and an unknown shielding scenario such as within a large metropolitan region. Upon detection in such a scenario, the unknown radioactive material must be identified, such as by its spectral signature. Additionally, a detection device having the ability to switch modes between low count rate detection (background radiation), small source detection, and high count rate is required, especially in consequence management situations where the count rate is high enough to present an immediate indication of significant amounts of nuclear material or a dangerous radiation environment.

In the past, various types of radiation detectors in various packages have been utilized, such as scintillation-based field detectors and cryogenically cooled high resolution germanium and silicon detectors. One problem with scintillation detectors, however, is that they do not provide high spectral resolution. And cryogenically cooled detectors require large batteries, external power, or cryogens to maintain operating temperature. Due to these problems, scintillation and cryogenically cooled detectors have been difficult to use in the field in a compact, handheld battery powered unit that provides in situ diagnostics.

IV. SUMMARY OF THE INVENTION

One aspect of the present invention includes a radiation detection instrument comprising: a mobile communications device having wireless means for communicating over a wireless communications network; a radiation detector operably connected to said mobile communications device; and means for analyzing data collected by the radiation detector and displaying said data via the mobile communications device.

Another aspect of the present invention includes a radiation detection instrument comprising: a mobile communications device having wireless means for communicating with a data server of a central monitoring system over a wireless communications network; a radiation detector operably connected to said mobile communications device for measuring the individual energies of detected photons; a clock-calendar operably connected to said mobile communications device for determining the time-date associated with each detected photon; and a locator operably connected to said mobile communications device for determining the location of said instrument associated with each detected photon, wherein said mobile communications device is adapted to transmit data of the individual photon energies and the corresponding detection time-date and detection location associated with each to the data server of said central monitoring system.

Another aspect of the present invention includes a radiation detection network, comprising: a central monitoring system having a data server connected to a wireless communications network; and a plurality of radiation detection instruments widely distributed in a geographic region, each instrument comprising: a mobile communications device having wireless means for communicating with the data server of the central monitoring system over the wireless communications network; a radiation detector operably connected to said mobile communications device for measuring the individual energies of detected photons; a clock-calendar operably connected to said mobile communications device for determining the time-date associated with each detected photon; and a locator operably connected to said mobile communications device for determining the location of said instrument associated with each detected photon, said mobile communications device adapted to transmit data of the individual photon energies and the corresponding detection time-dates and detection locations associated with each to the data server of said central monitoring system, wherein said central monitoring system includes means for collectively analyzing said data received from the plurality of radiation detection instruments, whereby a radiation source(s) may be identified and/or tracked.

And another aspect of the present invention includes a method of regional radiation monitoring comprising the steps of: widely distributing a plurality of radiation detection instruments in a region, with each instrument comprising a mobile communications device having wireless means for communicating over a wireless communications network; a radiation detector operably connected to said mobile communications device for measuring the individual energies of detected photons; a clock-calendar operably connected to said mobile communications device for determining the time-date associated with each detected photon; and a locator operably connected to said mobile communications device for determining the location of said instrument associated with each detected photon, on a data server of a central monitoring system connected to the wireless communications network: receiving data of the individual photon energies and the corresponding detection time-date and detection location associated with each from the plurality of radiation detection instruments in the region; and collectively analyzing said received data whereby a radiation source(s) may be identified and/or tracked.

V. BRIEF DESCRIPTION OF THE DRAWINGS

The accompanying drawings, which are incorporated into and form a part of the disclosure, are as follows.

VI. DETAILED DESCRIPTION

Figure 1:
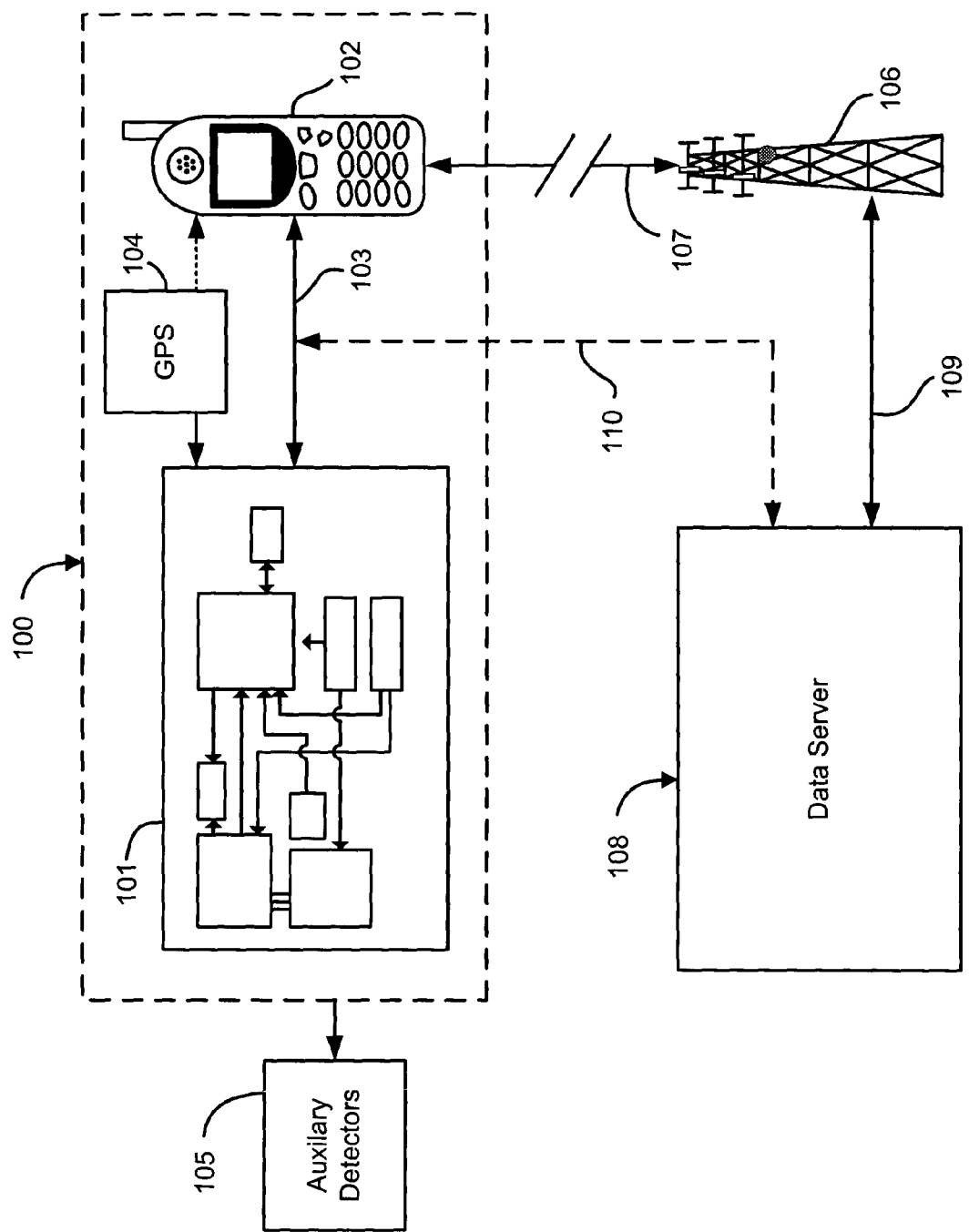
FIG. 1 is a schematic diagram of an exemplary detector unit in communication with a network of the present invention.

The present invention is generally directed to a portable (e.g. handheld), low-power, low-cost, high-performance detection instrument having a small application-specific sensor integrated with a cellular telephone, personal digital assistant ("PDA"), or other portable personal electronic device. Such portable personal electronic devices are preferably of a type having both a locator functionality for electronically determining the location of the instrument, e.g. using a global positioning system ("GPS") receiver, and a wireless communications functionality enabling mobile data transfer, e.g. using a wireless modem to enable mobile Internet access. Portable personal electronic devices having at least the wireless communications functionalities are generally referenced herein as mobile communications devices ("MCD"). It is appreciated that the locator and wireless communications functionalities may be provided by built-in components of the MCD, or in the alternative, by separate attachments which connect to the MCD via expansion ports. In any case, the detection instrument is generally configured to provide sensing/detecting and data analyzing functions directly to a user in the field, so as to provide enhanced functionality and added value beyond the basic functions provided by the MCD. As mentioned above, various types of application-specific sensors may be utilized for different detection applications including, for example, radiation sensors, chemical, and/or temperature sensors, shock, motion, aural and visual sensors, with each type of sensor particularly configured to detect the respective application-specific parameter. For example, a radiation sensor may be utilized which is configured to measure individual photon energies.

Additionally, in a wide-area detection network and system of the present invention, a plurality of such detection instruments are widely distributed in a wide-ranging geographic region, such as a city, county, or even state or nation-wide, with each unit configured to continuously monitor and automatically communicate with a central data collection, analysis, and monitoring system ("CENTRAL MONITORING SYSTEM") in real time. The central monitoring system uses the data obtained from the entire network of detection instruments to detect, identify and/or track and monitor emissions, e.g. radiation sources, or other sources of the application-specific detection, i.e. application-specific source (e.g. a chemical source) present in or moving through the region. It is notable that the locator device utilized in the present invention is preferably a coordinate locator based on an absolute coordinate system for location identification, such as the latitude, longitude and altitude coordinate system utilized by GPS systems to plot GPS coordinates. Another example includes coordinate locator systems employing the triangulation method. Furthermore, locations are not determined by or measured in relation to (distal, spatial, angular, or otherwise) the central monitoring system, since the central monitoring system need not be located within the region of interest.

Figure 2:
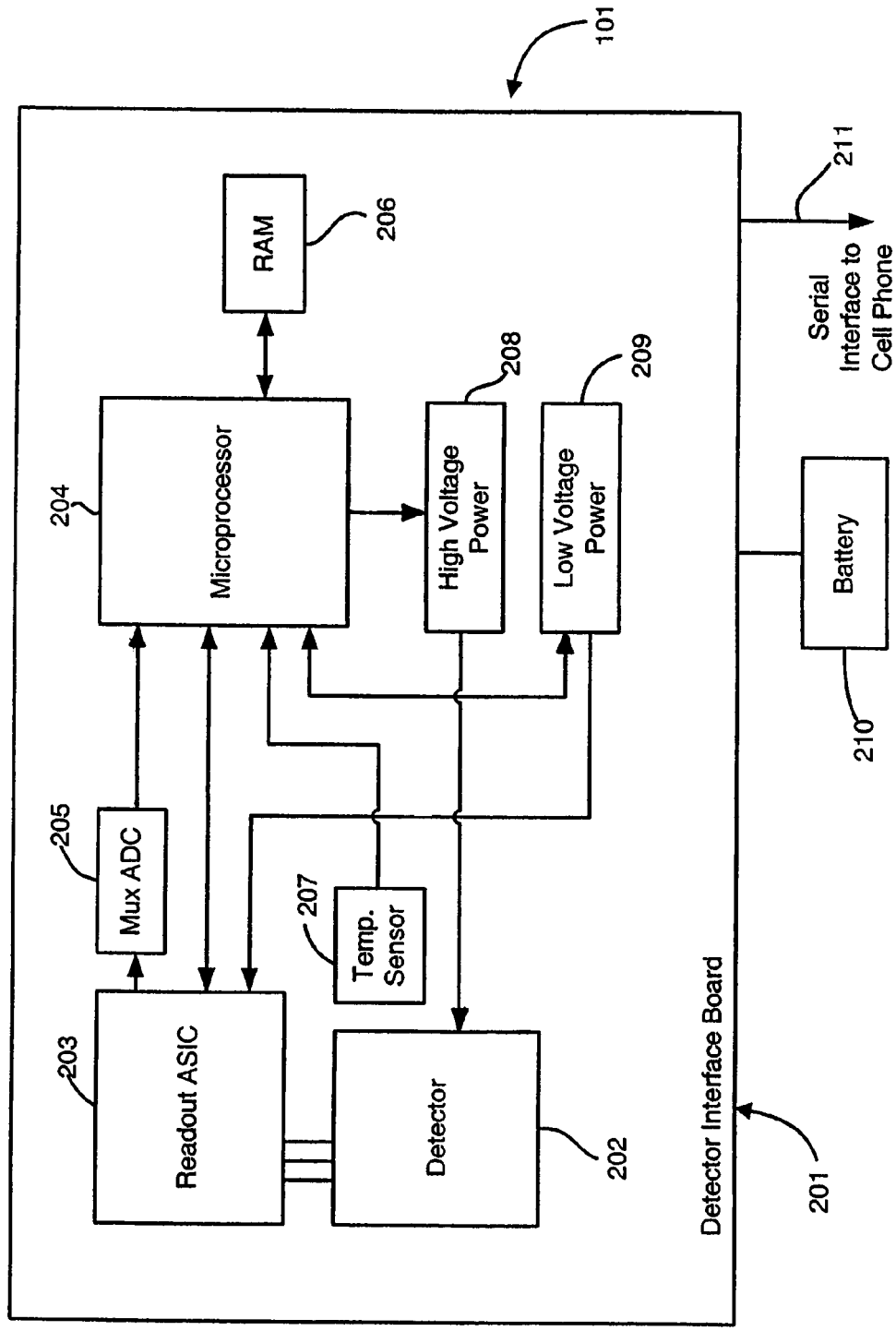
FIG. 2 is a schematic block diagram of an exemplary representative sensor module of the detector unit of the present invention.

Turning to the drawings, FIGS. 1 and 2 show schematic diagrams of an exemplary embodiment of the detection instrument particularly configured for radiation detection applications, and in particular to constantly monitor the local ambient radiation field. FIG. 1 shows a radiation detection instrument, generally indicated at reference character 100, comprising a MCD, such as a cellular phone 102 (generic shown), and a sensor module 101 (shown enlarged) operably connected to the cell phone 102 as indicated by arrow 103. The sensor module 101 is shown as a block diagram (enlarged in FIG. 2), and is representative of one or more IC boards/modules. And the operable connection to the MCD provides, for example, data porting/transfer by a suitably enabling interface, and may also provide power to the sensor module using the cell phone battery. An electronic locator device 104, such as a GPS receiver, is also shown provided with the instrument 100 for determining the coordinate location of the instrument 100. The locator 104 may be connected either to the sensor module (indicated by a solid arrow) or to the MCD (indicated by a broken line arrow) to associate the location determination with a corresponding detection event. And while not shown in the drawings, the sensor module has a generally flat configuration and is of a sufficiently small size to be mounted on or within the cell phone such that the total volume, weight and power consumption does not greatly exceed the cell phone alone. Furthermore, much larger sensors, such as those that might be mounted in a vehicle, can also be attached to the cell phone-sensor system.

The MCD is preferably of a type suitably chosen from commercially available models, but is not limited only to such. For example, Applicants have successfully utilized for integration a MCD sold under the trademark "Treo" by Handspring Corporation of Mountain View, Calif., and a model known as a "Smartphone 6035" sold by Kyocera Corporation of San Diego, Calif., both of which are a combination cell phone and PDA that provides readily-accessible on-board processing power and user controls/displays, as well as the necessary wireless communications and locator (by attachment) functionalities. When integrated with the Treo or Smartphone, the sensor module interfaces with the MCD by means of a serial port. In any case, the sensor module may be pre-installed as a built-in component of the cell phone, or in the alternative, detachably connectable as an attachment to the cell phone via an expansion port, IR data transfer or RF data transfer (e.g. "Bluetooth", a trademark of Bluetooth SIG for a particular short-range wireless specification) capability thereof as known and available with many current MCD technologies.

FIG. 2 shows in detail the various components of the radiation sensor module 101 of FIG. 1. The sensor module 101 includes an interface board 201 serving to mount and interconnect the various components of the sensor module 101 with each other, including a radiation detector/sensor 202 such as a solid state gamma-ray and/or neutron detector, and a microprocessor 206, among others. The detector is preferably a semiconductor material of a type operable in room temperature for measuring gamma-ray photons and/or neutrons, such as for example cadmium zinc telluride, cadmium telluride, mercuric iodide, lead iodide, or aluminum antimonide (CdZnTe, CdTe, HgI, PbI, AlSb), among others. The radiation detector 202 is directly connected by interconnects to low-power VLSI readouts, such as the application specific integrated circuit ("ASIC") readout 203, for radiation sensing. For example, a VLSI readout providing 512 individual "smart" pixels and all required processing electronics has been utilized by Applicants. And the sensor module 101 also includes a processor module at 204, which receives and processes all the data ("radiation data" collectively) from the readout ASIC 203, including for example the photon event list. The Readout ASIC 203 and the processor module 204 each communicates with a multiplexing analog-to-digital converter (Mux ADC) at 205 for the purpose of digitizing the detector data. The radiation data may also include detector temperature data obtained by a temperature sensor 207 adjacent the detector 202. And a RAM chip 206 is provided to enhance the processing power of the microprocessor and to provide onboard storage of data until transmission to a data server of the central monitoring system. it is appreciated that a data storage device of the cell phone/MDC may be utilized in the alternative. Power is supplied to the sensor module 101 by a battery 210 or other power source e.g. fuel cell, which may be the cell phone/MCD battery or a separate battery dedicated to the sensor module. In any case, a high voltage power source 208 and a low voltage power source 209 are provided, for supplying the appropriate level of power to the detector 202, the readout ASIC 203, the processor module 204. The radiation data collected and processed in this manner is then routed to the cell phone, such as by a serial interface as indicated by arrow 211. While not shown in the drawings, the detection instrument may also include a clock-calendar component operably connected to the mobile communications device for determining the time-date of each photon event detected by said radiation detector. Similarly, the clock-calendar may be used to determine a time-date associated with each unit of other application-specific parameters (e.g. chemical sensing applications). It is appreciated that the clock-calendar component may also be integrated as a built feature of the MCD, the locator (e.g. GPS) system, or the sensor module 101.

In one preferred embodiment, the radiation detector 202 is a pixelated CdZnTe ("CZT") detector, which is a low-cost, light-weight, and low-power, commercially available gamma-ray and neutron detection material, for determining the energy of each detected photon and neutron. Large quantities of moderate quality CZT can be mass produced at low cost using electronic fabrication techniques commonly known in the electronics manufacturing arts. More importantly, CZT is preferred for its excellent spectral resolution at room temperature (approximately 10–20 times better than scintillation-based systems), which improves background rejection and sensitivity, and diagnostic capability, e.g. identifying the sources of emission. Additionally, thermal neutrons can also be measured simultaneously by the capture reaction on the Cd in the CZT, or by capture in an attached boron layer, which results in a signal that the detector can distinguish from the incident gamma-rays to further enhance sensitivity and diagnostic capability. Furthermore, this high level of performance is achieved without requiring high-grade, high spectral resolution CZT material. The small pixel size provides excellent energy resolution even with commercial grade, moderate quality material. Since the pixelated detector is not utilized for imaging, pixels that include locations on the CZT crystal of poor detector quality (e.g. electron-hole trapping sites, grain boundaries, inclusions etc.) can excluded either by physically not connecting them, or by not including their output in the data stream. Gain variations across the crystal can also be corrected for electronically. In this manner, pixels located in regions of the detector having imperfections are disabled to improve overall detector resolution. Furthermore, small pixels have low capacitance thus reducing electronic noise, and provide improved spectral performance due to the electric field shaping and electron-hole motion referred to as the "small pixel effect." And CZT detectors fit well in the flat cell-phone/PDA package due to their typically flat, planar geometries. Using CZT mounted to and ASIC readout, the capacitance of the readout lines are minimized which also improves performance, and the volume of the readout and electronic support circuitry is less than 50% of the sensors themselves. CZT detectors are also rugged and mechanically robust for field applications. The characteristics and advantages of CZT detectors discussed above also apply to other room-temperature semiconductor detector materials including CdTe, HgI, PbI, and AlSb.

As an example, a CZT crystal array of approximately 30 $cm^2$ area, and pixelated at 2.5 mm has been successfully utilized by Applicants to achieve excellent energy resolution. For example, with a 5 mm crystal thickness, the photopeak absorption efficiency is greater than 30% up to 400 keV, and greater than 10% photopeak absorption efficiency out to 2 MeV. Thermal neutrons have been measured simultaneously by the capture reaction on $^{114}Cd$, 74% of which de-excites with the emission of a 558 keV gamma-ray photon. This performance is achieved with a total power draw of 25 mW for a 500 pixel system (~50 µW per pixel). For purpose of comparison, a typical digital cellular phone requires 100 mW in standby mode and an additional 100–900 mW while in "talk" mode. In addition, using advanced VLSI techniques to optimize the VLSI design and in particular the readout ASIC system, has enabled even greater performance and efficiency, small size, low power consumption, and reduced production costs. For example, minor changes in the readout have been successfully incorporated to optimize input capacitance on the input FET and to increase dynamic range, whereby further reductions in power requirement have been achieved to as low as ~30 µW per pixel or a total of 15 mW. Thus, a detector of the type of the present invention is capable of performing sophisticated thresholding, binning, spectral identification and storage without significant impact on the battery lifetime of the cell phone.

In this manner, the sensor module 101 (and the detection instrument generally) is configured to constantly monitor the local ambient radiation field and record list mode radiation data, such as the detection time, and energy of each detected photon, as well as associated location information obtained via a locator component of the cell phone or GPS system mounted with the sensor package. The radiation data may be reviewed, stored, transmitted, or otherwise controlled or used by means of the cell phone and the inherent and/or enhanced functionalities thereof such as user input controls, visual display, audio, porting, wireless communications capabilities. In particular, the detection instrument thus described, and the radiation data obtained thereby, may be utilized both for manual, stand-alone operation directly by a user in the field, or for networked operation by continuous radiation sensing, measurement, identification, and automatic reporting/transmission of the acquired data to a central monitoring system.

In the case of manual operation, the detection instrument is configured to detect and analyze radiation, and to make the data directly available to a user. For example, isotope identification software may be incorporated into the MCD or the sensor module itself as a user application for use in directly investigating suspect material. Such an application would enable a user to, for example, display radiation intensity, likely source composition, and other measurements in an easy-to-use interface provided by the MCD. In addition, the detection instrument may also be configured to trigger an alarm (provided by the MCD, such as by ring tone or vibration) alerting the user if a predetermined high flux of radiation is measured with respect to background radiation.

Such alarm functionality is preferably a "smart" alarm, i.e. programmable with different thresholds for different applications, such as being triggered by specified sources. This can allow the alarm not to trigger upon detecting benign isotopes being used in, for example, medical diagnostics and treatments, despite meeting the threshold criteria. One of the most common "nuisance" alarms may be reduced in this manner, providing more sensitivity to the radioactive sources of real concern.

Figure 3:
FIG. 3 is an exemplary graphic representation of a geographic region monitored by the detection network of the present invention.

And in the case of networked operation, FIG. 1 shows the wide-area detector network and system of the present invention having a detection instrument 100 in remote communication (e.g. two-way digital) with a data server 108 of a central monitoring system, via an in-place wireless communications network represented by a cell tower 106 and arrows 107 and 109. While only one is shown, the single detection instrument 100 is representative of a large number plurality (e.g. >100 and preferably >1000) of detection instruments comprising the detector network and widely distributed in a given wide-ranging geographic region to provide thorough coverage of the region, as illustrated in FIG. 3. FIG. 3 shows a widespread, mobile, and nearly random distribution of sensor instruments (shown as circular points) forming the network. In this manner, each detection instrument is in remote communication with the data server 108 of the central monitoring system and configured to continuously monitor and automatically transmit the collected data thereto in real time without user intervention, e.g. continual autonomous operation in "standby" mode. In particular, each instrument unit independently reports at least the time, location, and energy of every detected photon pulse, especially in low count-rate environments. It is notable that "real time" transmission includes instantaneous transmission of data upon detection, as well as transmitting data in intervals of suitably short duration.

Furthermore, the detection instruments may also be connected to and utilized in conjunction with larger mobile and/or fixed detectors, represented as auxiliary detectors 105 in FIG. 1. These additional sensors can use the cell phone-sensor system to send data back to the server, or data from the cell phone sensor network can be combined with an independent sensor network that may include mobile, fixed, or portal monitor sensors. Fixed portal detectors are shown as diamonds in FIG. 3 and are much easier to circumvent compared to the network of sensor instruments. Moreover, such fixed portal detectors provide very little total area coverage because the gamma-radiation does not penetrate more than 100 meters in air. Radiation data collected from such auxiliary detectors may be used to supplement and enhance the analysis algorithm for radiation sensing and detection. Such larger sensor modules can provide inexpensive expansion capability of the detection network and system. And a diagnostic and development link 110 is also shown in FIG. 1 whereby information from the sensor instrument 100 may be provided directly to the data server 108.

As previously described, radiation data is preferably transmitted by the detection instrument over the Internet using a wireless communications network. In this respect, the data server 108 shown in FIG. 1 is a web server using a web protocol such as HTTP. In an example implementation, a cellular phone automatically connects to the cellular ISP (internet service provider) by mobile dial-up access, and transmits the data to the web server which accepts the data and logs the IP and phone ID. As an alternative to using an ISP connection, various "always-on" mobile Internet connections systems (e.g. GPRS or 3G) are now becoming available. In particular, data transmission by the cell phone is preferably performed using GPRS ("general packet radio service") which is a GSM data transmission technique for transmitting and receiving data in packets. The use of GPRS provides "always-on" data transfer channels to the data server, and can be provided via a virtual private network (VPN) over the Internet. Furthermore, data encryption may be used in the wireless data transfer using, for example, 3DES (Triple DES, 168 bit encryption). Internet connection via GSM or GSM/3G (third generation mobile communications) is now available providing higher bandwidth. And it is appreciated that the next generation of GPS receivers, including GPS systems that receive assistance in location fixing by way of the cellular phone network and those that employ large number of correlators on chip providing very rapid time to first fix, will have a significant positive impact on the ability of the devices to position the detected radiation.

In this manner, the data server of the central monitoring system, receives radiation data in real time from a very large number of detection instruments, from which a multi-dimensional map is created of the background radiation in a region, its energy dependence, and variation in background radiation as a function of location, time of day, weather, and other factors known or found to affect the background radiation. Monitoring and analysis of the collected radiation data is performed by means of an algorithm/software ("ALGORITHM") associated with and preferably running on the central monitoring system, and configured to incorporate the statistical background data, temporal variations in background, motion of the detection instruments, and measured traffic information. The algorithm operates to determine in real time any anomalies from the background radiation which may indicate the presence of a radiation source. It does so by attempting to find correlations in deviations from the background radiation. Correlation routines are performed to determine spectral, spatial, temporal correlations for both a single unit and for multiple units.

It is notable that the algorithm operates to track radioactive sources using every measured photon, and performs an ongoing calculation of the probability that a given photon, with a certain energy, time and location, originated from a source of interest. To this end, list mode data is preferably transmitted from each detection instrument to the central monitoring system in nominal, low count-rate situations, since list mode processing preserves full information content. In high count-rate situations, however, data is preferably binned for batch transmission. At a minimum, such transmitted list-mode data must include the time, location, and energy of each photon that is detected. By preserving more of the information about each photon and combining this information, and other prior knowledge, with the photon histories available from all of the other detection instruments that are or have been active, the algorithm can generate significantly higher sensitivity than any individual detection instrument alone. The algorithm serves to properly weight the significance of each event recorded, without binning or other data combination techniques that limit the sensitivity of other techniques. For example, applying a traditional technique such as triggering on variations in the energy-binned count rate, reduces the probability of detection since any threshold must be set so high to avoid false alarms.

Thus the algorithm ties all the detectors together into one large "imaging" detector with sensitivity far greater than any individual sensor. Since sensitivity is independent of detector area when spatial or temporal variations in the background are greater than Poisson variations, the sensitivity of this method and the probability of detection will improve as more background and background-related data are acquired by the detection instruments. Thus, by widely spreading out the detection instruments in a geographic region, anomalies may be detected over a large area, even while utilizing smaller, detectors having lower individual efficiency and resolution.

Additionally, the detection network also operates to track the position of a source as it moves through the network. In particular, Bayesian and other statistical methods may be utilized to calculate the likelihood that a source has been moving along various trajectories, constantly updating the calculations as more data either support or contradict each hypothesis. This technique thus looks for correlations in the measured signals as a function of time and location. The instrument location data obtained by, for example, a GPS locator, will also give real-time measurements of the traffic flow, which can be combined with statistical analysis of traffic flow to improve the accuracy of the velocity parameters used in the correlation analysis.

Once a detection of a radioactive source of interest occurs, the network can be immediately reconfigured to increase the confidence of the detection, and possibly provide interdiction. This is enabled by the two-way digital communication between each detection instrument and the data server of the central monitoring system, wherein the central system (e.g. an operator thereof) contacts and mobilizes the users. In particular, detection instrument users can be notified via the cell phone, either by voice or by text digitally, to move to a new location to improve detection of a given source. Search teams can be given displays that show their location, the location of the other members of the team, and the radiation levels measured by the team. Search team leaders can then send commands to individual team members with alterations in their search plan as necessary. Once a radioactive source of interest is located, the appropriate cell phone sensor users (e.g. those who are deputized law enforcement officers) could be notified in order to stop or redirect the suspect source.

Additionally, the detector network of the present invention may also be used to provide real time support to emergency/first responder users in a consequence management scenario, such as for example a dirty bomb deployment in a metropolitan area. Management and response in this scenario is also enhanced by the two-way digital communication between each detection instrument and the data server of the central monitoring system. For example, radiation risks may be identified by the central monitoring system by mapping the extent of contamination, with users in the area subsequently notified with local and regional nuclear contamination information. And by tracking the spread of nuclear contamination, system-wide directives, instructions and communications may be provided to users to efficiently coordinate and/or organize efforts.

And the detection instrument may also be used as an in-place radiation monitor operating in a store data mode to monitor radiation levels of a specific object or location. For example, the detection instrument may be used to tag suspect items, attach to transport containers, be placed in cargo holds, etc., to be activated and read-out from an off-shore station, ship or aircraft.

It is notable that the distribution of the detection instruments in large numbers throughout a wide area region is possible, in part, by the inherent value and basic functionalities provided by such cell phones and other MCDs, such as the basic cell phone and/or PDA functionalities, portable internet access, email, etc. Since users have a strong incentive to purchase the detection instrument units commercially, this can compensate the cost of procuring the instruments, and the trouble of carrying them. Moreover, this ensures that the detection instrument is properly maintained in working order (e.g. charging the battery), and available and ready for use at all times. It is anticipated that the detection instruments of the present invention would be purchased by or issued to government agencies, such as but not limited to, U.S. customs; law enforcement (local, state, federal); emergency services, e.g. fire fighters; other security and first responder personnel; mass transit; postal service; military; intelligence services; etc. In addition, even greater network distribution may be achieved in the private sector, such as commercial operations, e.g. car and truck rentals, delivery services; taxi; trucking; etc. In any case the units will be carried and used by these people as part of their regular everyday equipment.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A radiation sensor module comprising:
   a radiation detector made of a room temperature-operable, solid state semiconductor detection material capable of detecting gamma-ray photons and/or neutrons, and pixelated into a plurality of small pixel effect type pixels wherein pixels located in regions of the detection material having imperfections are individually disabled to enhance detector performance and high spectral resolution;
   a temperature sensor capable of measuring the temperature of said detection material; and
   means for adjusting the overall gain of the detection material as a function of time based on the temperature measured by said temperature sensor, to improve spectral resolution of said radiation detector.

2. The radiation sensor module of claim 1,
   further comprising a readout having a plurality of channels connected to the pixels for electronically processing detection data obtained therefrom.

3. The radiation sensor module as in claim 2,
   wherein the plurality of channels of said readout are connected only to the pixels in regions without imperfections.

4. The radiation sensor module as in claim 2,
   further comprising an interface board, and
   wherein the readout is an ASIC readout chip mounted on the interface board together with said radiation detector, with the ASIC readout chip and said radiation detector connected to each other by interconnects on the interface board.

5. The radiation sensor module as in claim 4,
   wherein said ASIC readout chip is a VLSI readout chip bonded to the pixels of said detection material.

6. The radiation sensor module as in claim 1,
   further comprising data processing means for excluding from analysis detection data obtained from the pixels in said regions having imperfections.

7. The radiation sensor module as in claim 6,
   wherein said data processing means includes means for setting a level of inclusion/exclusion in analysis of detection data obtained from the pixels in said regions with imperfections to provide either higher resolution or higher efficiency.

8. The radiation sensor module as in claim 1,
wherein said radiation detection material is chosen from the group consisting of cadmium zinc telluride, cadmium telluride, mercuric iodide, lead iodide, and aluminum antimonide.

9. The radiation sensor module as in claim 1,
wherein said radiation detection material is a commercial-grade material having low spectral resolution when operated as a single-crystal detector.

10. A radiation sensor module comprising:
a radiation detector made of a room temperature-operable, solid state semiconductor detection material capable of detecting gamma-ray photons and/or neutrons, and pixelated into a plurality of small pixel effect type pixels wherein pixels located in regions of the detection material having imperfections are individually disabled to enhance detector performance and high spectral resolution;
means for adjusting the gain of each pixel to correct variations in detection material properties across the pixels of the detection material to further enhance spectral resolution; and
a temperature sensor capable of measuring the temperature of each of said plurality of pixels, wherein adjustments made by said means for adjusting the gain of each pixel are based on variations of the temperature across the pixels of said detection material determined by said temperature sensor.

11. A radiation detection system comprising:
communications means for communicating over a communications network, said communications means including means for automatically transmitting the detection data without input from a user; and
a radiation sensor module operably connected to said communications means for transmitting detection data over said communications network, said radiation sensor module including a radiation detector made of a room temperature-operable, solid state semiconductor detection material capable of detecting gamma-ray photons and/or neutrons, and pixelated into a plurality of small pixel effect type pixels wherein pixels located in regions of the detection material having imperfections are individually disabled to enhance detector performance and high spectral resolution.

12. The radiation detection system as in claim 11,
wherein said communications means and said radiation sensor module are two separate modules.

13. The radiation detection system as in claim 12,
wherein said communications means and said radiation sensor module are operably connected by wires.

14. The radiation detection system as in claim 12,
wherein said communications means and said radiation sensor module are operably connected via a wireless link.

15. The radiation detection system as in claim 12,
wherein said radiation sensor module is attachable to an object independent of said communications means.

16. The radiation detection system as in claim 11,
wherein the automatic transmission of the detection data is in real time.

17. The radiation detection system as in claim 11,
further comprising means for analyzing detection data obtained by said radiation sensor module.

18. The radiation detection system as in claim 11,
further comprising means for displaying detection data obtained by said radiation sensor module.

19. The radiation detection system as in claim 11,
wherein said communications means is a mobile wireless communications device.

20. The radiation detection system as in claim 11,
wherein the radiation sensor module further comprises a readout having a plurality of channels connected to the pixels for electronically processing detection data obtained therefrom.

21. The radiation detection system as in claim 20,
wherein the pixels located in said regions having imperfections are individually disabled by connecting the plurality of channels of said readout only to the pixels in regions without imperfections.

22. The radiation detection system as in claim 20,
wherein the radiation sensor module further comprises an interface board, and
wherein the readout is an ASIC readout chip mounted on the interface board together with said radiation detector, with the ASIC readout chip and said radiation detector connected to each other by interconnects on the interface board.

23. The radiation detection system as in claim 22,
wherein said ASIC readout chip is a VLSI readout chip bonded to the pixels of said detection material.

24. The radiation detection system as in claim 11,
wherein the radiation sensor module further comprises data processing means for excluding from analysis detection data obtained from the pixels in said regions having imperfections.

25. The radiation detection system as in claim 24,
wherein said data processing means includes means for setting a level of inclusion/exclusion in analysis of detection data obtained from the pixels in said regions with imperfections to provide either higher resolution or higher efficiency.

26. The radiation detection system as in claim 11,
wherein said radiation detection material is chosen from the group consisting of cadmium zinc telluride, cadmium telluride, mercuric iodide, lead iodide, and aluminum antimonide.

27. The radiation detection system as in claim 11,
wherein said radiation detection material is a commercial-grade material having low spectral resolution when operated as a single-crystal detector.

28. A radiation detection system comprising:
communications means for communicating over a communications network, said communications means including means for communicating with a data server of a central monitoring system over said communications network, for transmitting detection data to said data server; and
a radiation sensor module operably connected to said communications means for transmitting detection data over said communications network, said radiation sensor module including a radiation detector made of a room temperature-operable, solid state semiconductor detection material capable of detecting gamma-ray photons and/or neutrons, and pixelated into a plurality of small pixel effect type pixels wherein pixels located in regions of the detection material having imperfections are individually disabled to enhance detector performance and high spectral resolution.

29. The radiation detection system as in claim 28,
wherein said communications means includes means for automatically transmitting the detection data to the data server of said central monitoring system without input from a user.

30. The radiation detection system as in claim 29, wherein the automatic transmission of the detection data is in real time.

31. A radiation detection system comprising:

communications means for communicating over a communications network;

a radiation sensor module operably connected to said communications means for transmitting detection data over said communications network, said radiation sensor module including a radiation detector made of a room temperature-operable, solid state semiconductor detection material capable of detecting gamma-ray photons and/or neutrons, and pixelated into a plurality of small pixel effect type pixels wherein pixels located in regions of the detection material having imperfections are individually disabled to enhance detector performance and high spectral resolution;

means for adjusting the gain of each pixel to correct variations in detection material properties across the pixels of the detection material to further enhance spectral resolution; and a temperature sensor capable of measuring the temperature of each of said plurality of pixels, wherein adjustments made by said means for adjusting the gain of each pixel are based on variations of the temperature across the pixels of said detection material determined by said temperature sensor.

32. A radiation detection system comprising:

communications means for communicating over a communications network;

a radiation sensor module operably connected to said communications means for transmitting detection data over said communications network, said radiation sensor module including a radiation detector made of a room temperature-operable, solid state semiconductor detection material capable of detecting gamma-ray photons and/or neutrons, and pixelated into a plurality of small pixel effect type pixels wherein pixels located in regions of the detection material having imperfections are individually disabled to enhance detector performance and high spectral resolution;

a temperature sensor capable of measuring the temperature of said detection material; and means for adjusting the overall gain of the detection material as a function of time based on the temperature measured by said temperature sensor, to improve spectral resolution of said radiation detector.

33. A radiation sensor module comprising:

a radiation detector made of a room temperature-operable, solid state semiconductor detection material capable of detecting gamma-ray photons and/or neutrons, and pixelated into a plurality of small pixel effect type pixels wherein pixels located in regions of the detection material having imperfections are individually disabled to enhance detector performance and high spectral resolution; and data processing means for excluding from analysis detection data obtained from the pixels in said regions having imperfections, said data processing means including means for setting a level of inclusion/exclusion in analysis of detection data obtained from the pixels in said regions with imperfections to provide either higher resolution or higher efficiency.

* * * * *